US012656977B2

(12) United States Patent
Yoon et al.

(10) Patent No.: US 12,656,977 B2
(45) Date of Patent: *Jun. 16, 2026

(54) MEMORY CONTROLLER AND MEMORY CONTROL METHOD

(71) Applicant: Samsung Electronics Co., Ltd., Suwon-si (KR)

(72) Inventors: Hosang Yoon, Yongin-si (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

This patent is subject to a terminal disclaimer.

(21) Appl. No.: 18/457,505

(22) Filed: Aug. 29, 2023

(65) Prior Publication Data

US 2024/0004588 A1    Jan. 4, 2024

Related U.S. Application Data

(63) Continuation of application No. 17/483,083, filed on Sep. 23, 2021, now Pat. No. 11,907,575.

(30) Foreign Application Priority Data

Feb. 8, 2021    (KR) ........................ 10-2021-0017653
May 6, 2021    (KR) ........................ 10-2021-0058628

(51) Int. Cl.
*G06F 3/06*    (2006.01)
(52) U.S. Cl.
CPC .......... *G06F 3/0659* (2013.01); *G06F 3/0604* (2013.01); *G06F 3/0656* (2013.01); *G06F 3/0679* (2013.01)

(58) Field of Classification Search
CPC .... G06F 3/0659; G06F 3/0604; G06F 3/0656; G06F 3/0679; G06F 13/1673; G06F 13/1668
See application file for complete search history.

(56) References Cited

U.S. PATENT DOCUMENTS

| | | | |
|---|---|---|---|
| 10,140,104 B2 | 11/2018 | Leidel | |
| 2011/0320695 A1 | 12/2011 | Berger et al. | |
| 2016/0306614 A1 | 10/2016 | Leidel | |
| 2017/0177498 A1 | 6/2017 | Wilkes | |
| 2017/0285988 A1 | 10/2017 | Dolbelstein et al. | |
| 2017/0300269 A1* | 10/2017 | Um ...................... | G06F 11/1048 |
| 2019/0034097 A1 | 1/2019 | Chang et al. | |
| 2020/0035291 A1 | 1/2020 | Kasibhatla et al. | |
| 2020/0356305 A1* | 11/2020 | Kim ...................... | G06F 3/0659 |
| 2021/0110876 A1* | 4/2021 | Seo ...................... | G06F 1/3275 |
| 2021/0209455 A1* | 7/2021 | Song ...................... | G06F 3/061 |

(Continued)

*Primary Examiner* — Scott T Baderman
(74) *Attorney, Agent, or Firm* — NSIP Law

(57) ABSTRACT

A memory controller includes: a first buffer configured to receive a memory request from a host and store therein the received memory request; a command generator configured to generate a first command corresponding to the memory request, and set a type of the first command indicating whether an address comprised in the memory request corresponds to a processing in memory (PIM) memory; a second buffer configured to store therein a plurality of commands comprising the first command; and a command scheduler configured to determine whether to change an order of the first command stored in the second buffer based on the type of the first command.

8 Claims, 6 Drawing Sheets

(56)                  References Cited

U.S. PATENT DOCUMENTS

| | | | | |
|---|---|---|---|---|
| 2022/0012054 A1* | 1/2022 | Kim | ..................... | G06F 9/4498 |
| 2022/0253246 A1* | 8/2022 | Seo | ..................... | G06F 3/0659 |
| 2022/0292033 A1 | 9/2022 | Yu et al. | | |

* cited by examiner

Address field

| Bit 63 | . . . | Area separating bit 201 | . . . | Bit 1 | Bit 0 |
|---|---|---|---|---|---|

FIG. 2

Second buffer 125

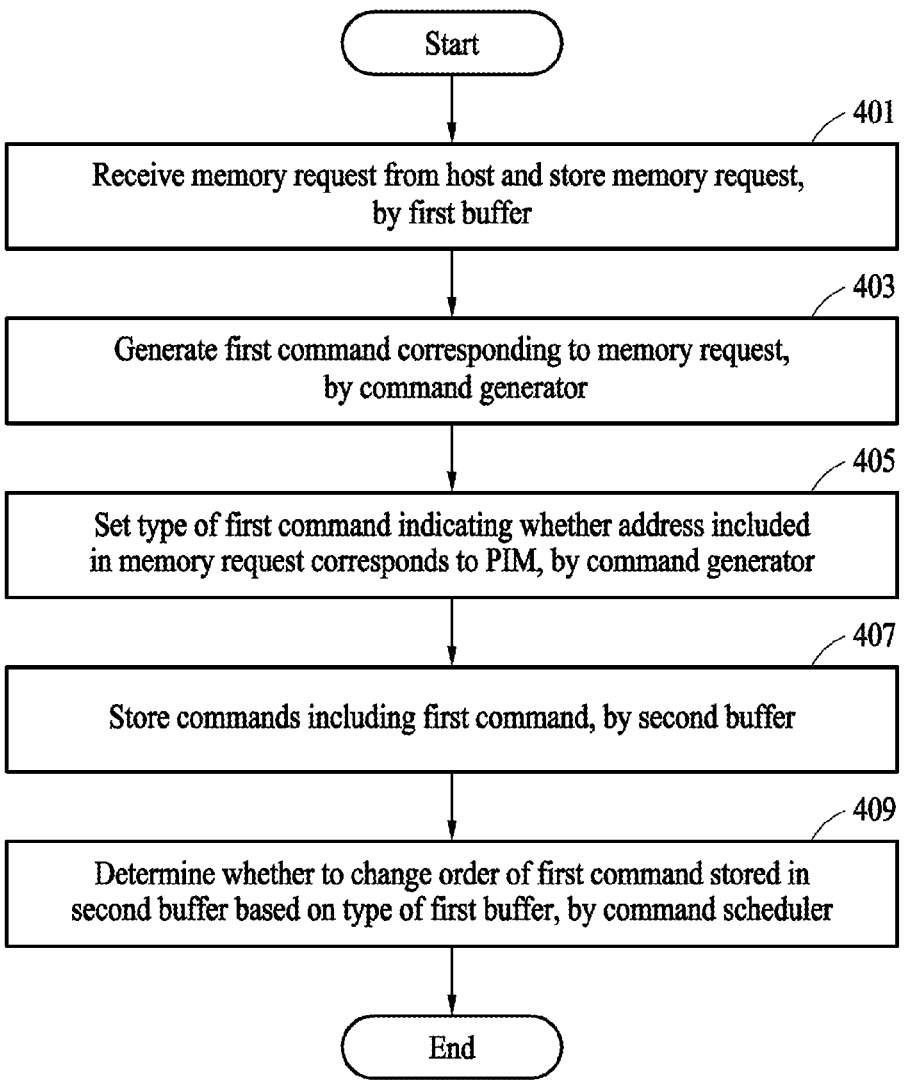

Start

401

Receive memory request from host and store memory request,
by first buffer

403

Generate first command corresponding to memory request,
by command generator

405

Set type of first command indicating whether address included
in memory request corresponds to PIM, by command generator

407

Store commands including first command, by second buffer

409

Determine whether to change order of first command stored in
second buffer based on type of first buffer, by command scheduler End

FIG. 4

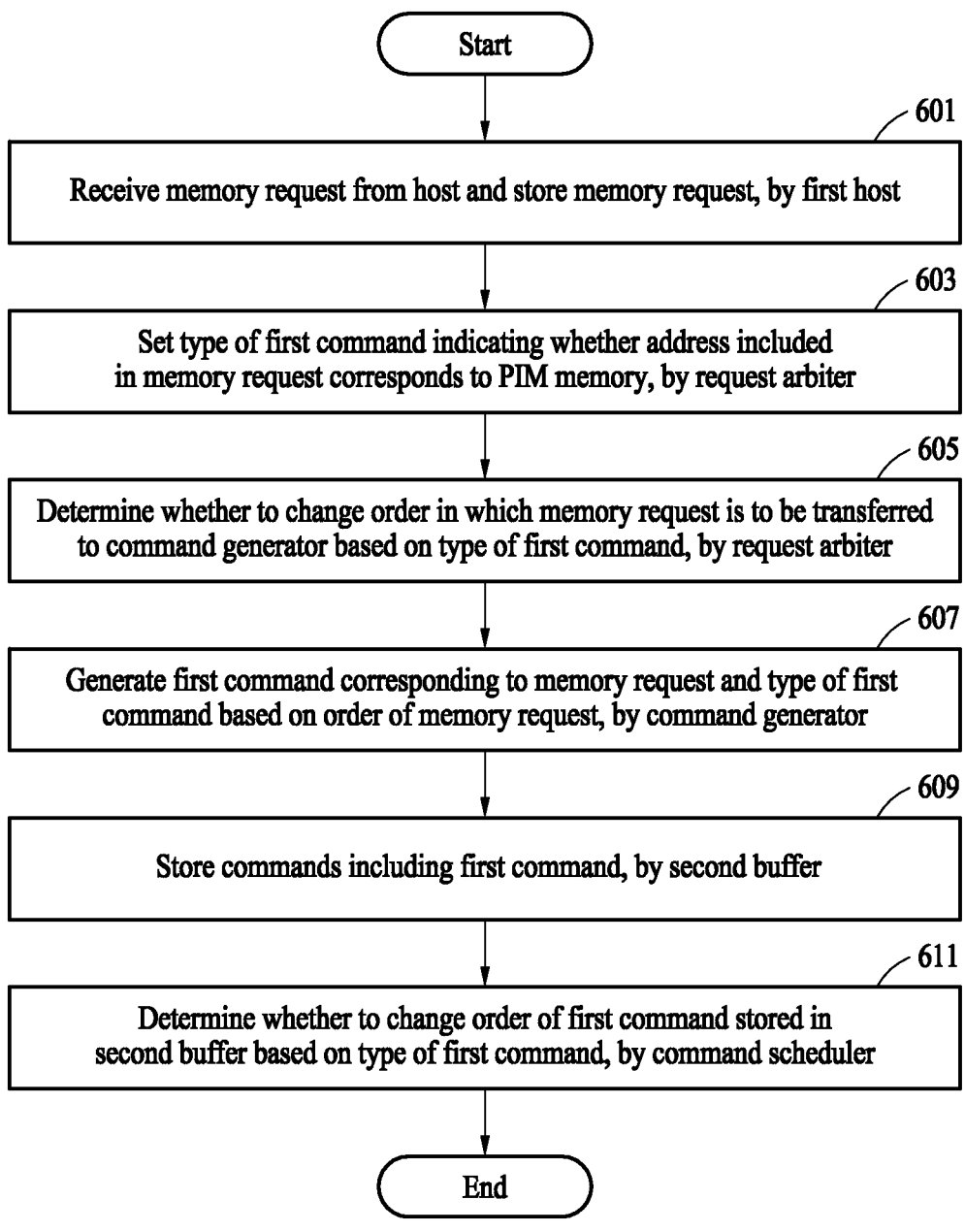

Start

Receive memory request from host and store memory request, by first host          601

Set type of first command indicating whether address included
in memory request corresponds to PIM memory, by request arbiter          603

Determine whether to change order in which memory request is to be transferred
to command generator based on type of first command, by request arbiter          605

Generate first command corresponding to memory request and type of first
command based on order of memory request, by command generator          607

Store commands including first command, by second buffer          609

Determine whether to change order of first command stored in
second buffer based on type of first command, by command scheduler          611

End

FIG. 6

MEMORY CONTROLLER AND MEMORY CONTROL METHOD

CROSS-REFERENCE TO RELATED APPLICATIONS

This application is a continuation of U.S. patent application Ser. No. 17/483,083 filed on Sep. 23, 2021 which claims the benefit under 35 USC § 119(a) of Korean Patent Application No. 10-2021-0017653 filed on Feb. 8, 2021, and Korean Patent Application No. 10-2021-0058628 filed on May 6, 2021, in the Korean Intellectual Property Office, the entire disclosures of which are incorporated herein by reference for all purposes.

BACKGROUND

1 Field

The following description relates to a memory controller and memory control method.

2. Description of Related Art

In a model such as a von Neumann architecture, data is stored in a memory. The memory may be separated from a processor, and the data may move between the two. In such an architecture, a delay may inevitably occur due to frequent movements of data. When the speed of the processor increases, the memory may be improved. However, the improvement of the memory may be to improve the performance of storing a greater quantity of data in a smaller space, instead of improving a transfer speed. An increase in the waiting time used to wait until data is fetched from the memory to the processor may limit the speed of the processor to a transfer speed at a bottleneck point. In a typical computer architecture, a von Neumann bottleneck at which throughput is limited due to the waiting time may occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a memory controller includes: a first buffer configured to receive a memory request from a host and store therein the received memory request; a command generator configured to generate a first command corresponding to the memory request, and set a type of the first command indicating whether an address comprised in the memory request corresponds to a processing in memory (PIM) memory; a second buffer configured to store therein a plurality of commands comprising the first command; and a command scheduler configured to determine whether to change an order of the first command stored in the second buffer based on the type of the first command.

For the determining of whether to change the order of the first command, the command scheduler may be configured to maintain the order of the first command in response to the type of the first command indicating the PIM memory.

For the determining of whether to change the order of the first command, the command scheduler may be configured to change the order of the first command in response to the type of the first command indicating a general memory.

The memory request may include a field indicating the address, the field may include an area separating bit that separates an address of a general memory and an address of the PIM memory, and for the setting of the type of the first command, the command generator may be configured to set the type of the first command based on the area separating bit.

In another general aspect, a memory controller includes: a first buffer configured to receive a memory request from a host and store therein the received memory request; a request arbiter configured to set a type of a first command indicating whether an address comprised in the memory request corresponds to a processing in memory (PIM) memory, and determine whether to change an order of the memory request to be transferred to a command generator based on the type of the first command; the command generator, wherein the command generator may be configured to generate the first command corresponding to the memory request and the type of the first command based on the order of the memory request; a second buffer configured to store therein a plurality of commands comprising the first command; and a command scheduler configured to determine whether to change an order of the first command stored in the second buffer based on the type of the first command.

For the determining of whether to change the order of the memory request, the request arbiter may be configured to maintain the order of the memory request in response to the type of the first command indicating the PIM memory.

For the determining of whether to change the order of the memory request, the request arbiter may be configured to change the order of the memory request in response to the type of the first command indicating a general memory.

For the determining of whether to change the order of the first command, the command scheduler may be configured to maintain the order of the first command in response to the type of the first command indicating the PIM memory.

For the determining of whether to change the order of the first command, the command scheduler may be configured to change the order of the first command in response to the type of the first command indicating a general memory.

The memory request may include a field indicating the address, the field may include an area separating bit that separates an address of a general memory and an address of the PIM memory, and for the setting of the type of the first command, the request arbiter may be configured to set the type of the first command based on the area separating bit.

In another general aspect, a memory control method includes: by a first buffer, receiving a memory request from a host and storing therein the received memory request; by a command generator, generating a first command corresponding to the memory request, and setting a type of the first command indicating whether an address comprised in the memory request corresponds to a processing in memory (PIM) memory; by a second buffer, storing therein a plurality of commands comprising the first command; and by a command scheduler, determining whether to change an order of the first command stored in the second buffer based on the type of the first command.

The determining of whether to change the order of the first command may include: in response to the type of the first command indicating the PIM memory, maintaining the order of the first command by the command scheduler.

The determining of whether to change the order of the first command may include: in response to the type of the first command indicating a general memory, changing the order of the first command by the command scheduler.

In another general aspect, a memory control method includes: by a first buffer, receiving a memory request from a host and storing therein the received memory request; by a request arbiter, setting a type of a first command indicating whether an address comprised in the memory request corresponds to a processing in memory (PIM) memory, and determining whether to change an order of the memory request to be transferred to a command generator based on the type of the first command; by the command generator, generating the first command corresponding to the memory request and the type of the first command based on the order of the memory request; by a second buffer, storing therein a plurality of commands comprising the first command; and by a command scheduler, determining whether to change an order of the first command stored in the second buffer based on the type of the first command.

The determining of whether to change the order of the memory request may include: in response to the type of the first command indicating the PIM memory, maintaining the order of the memory request.

The determining of whether to change the order of the memory request may include: in response to the type of the first command indicating a general memory, changing the order of the memory request.

The determining of whether to change the order of the first command may include: in response to the type of the first command indicating the PIM memory, maintaining the order of the first command.

The determining of whether to change the order of the first command may include: in response to the type of the first command indicating a general memory, changing the order of the first command.

The memory request may include a field indicating the address, the field may include an area separating bit that separates an address of a general memory and an address of the PIM memory, and the setting of the type of the first command may include setting the type of the first command based on the area separating bit.

In another general aspect, a memory controller includes: a command generator configured to set a type of a command based on an area separating bit of an address in a stored memory request, the type indicating whether the address corresponds to a processing in memory (PIM) memory; a command scheduler configured to determine whether to change an order of the command stored in a buffer based on the type of the command set by the command generator.

The area separating bit may correspond to a value range, and for the setting of the type of the command, the command generator may be configured to: set the type of the command indicating the address corresponds to the PIM memory, in response to a value of a field of the address being greater than the value range; and set the type of the command indicating the address corresponds to a general memory, in response to the value of the field being within the value range.

For the determining of whether to change the order of the command, the command scheduler may be configured to maintain the order of the command and change an order of one or more other commands stored in the buffer, in response to the type of the command indicating the PIM memory.

The memory controller may be configured to access a memory based on the order of the command.

Other features and aspects will be apparent from the following detailed description, the drawings, and the claims.

BRIEF DESCRIPTION OF THE DRAWINGS

FIG. 2 illustrates an example of a field in which an address included in a memory request used by a memory controller is stored.

FIG. 4 illustrates an example of a memory control method.

FIG. 6 illustrates an example of a memory control method.

Figure 1:
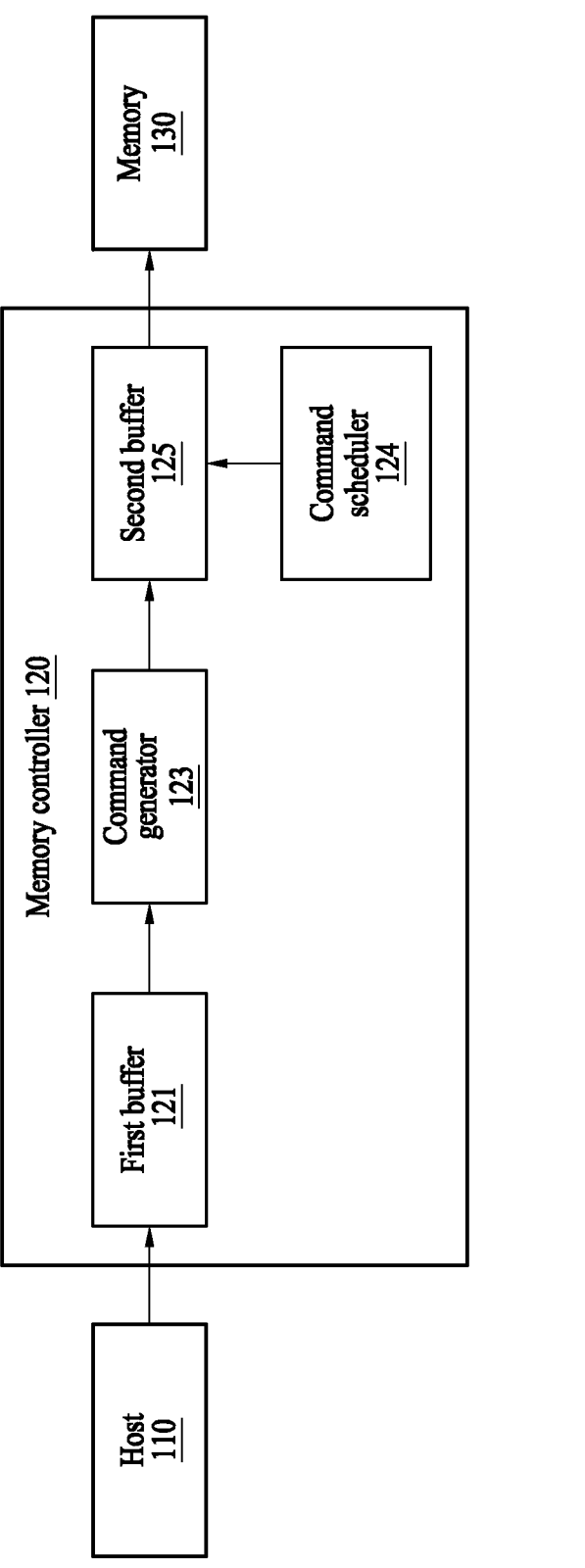
FIG. 1 illustrates an example of a configuration of a memory controller.

Throughout the drawings and the detailed description, unless otherwise described or provided, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of a configuration of a memory controller.

Referring to FIG. 1, a memory controller 120 may include a first buffer 121, a command generator 123, a command scheduler 124, and a second buffer 125. The command generator 123 and the command scheduler 124 may be integrated into a single device which may also be referred to herein as a command controller. The command controller may perform operations of the command generator 123 and the command scheduler 124.

In such a process, an order of commands stored in a queue may be changed. For example, a general memory controller may change an order of commands "READ," "READ," and "WRITE," stored in the queue to an order of commands "WRITE," "READ," and "READ" for more effective memory access.

A processing in memory (PIM) memory may be used to perform an operation in a single-chip memory to prevent a von Neumann bottleneck that occurs in a typical computer architecture. The PIM memory may not only store data but also have an operation that is performed therein through an internal processor. Thus, when the order of commands in the queue is changed, efficiency of a typical PIM memory may be degraded. The operation performed in the typical PIM memory may be suitable for (or may efficiently process) an original order of commands stored in the queue, but not for a rearranged order of the commands. In addition, an additional operation of changing the order of the commands rearranged for the operation performed in the typical PIM memory to the original order may use an additional resource and cause the performance to be degraded.

In an example, the memory controller 120 may maintain or determine an order of memory commands for a PIM memory area. For this, the command generator 123 may verify addresses included in memory requests transferred from a host 110. For example, the command generator 123 may identify whether an address included in a memory request corresponds to a general memory area or the PIM memory area based on an area separating bit included in the memory request. When the memory request is determined to correspond to the PIM memory area, the command generator 123 may generate a command by setting a type indicating a request for the PIM memory area. The command generator 123 may transfer the generated command to a queue of the second buffer 125, and the command scheduler 124 may maintain an order of the command for the PIM memory area for access to a memory 130.

The host 110 may transfer the memory request to the first buffer 121 of the memory controller 120. The first buffer 121 may receive the memory request from the host 110 and store the memory request. The memory request may include information of a command to be performed by the memory controller 120. The memory request may include a type of the command and an address of the command. In addition, for writing, the memory request may further include a content to be written in the address of the command.

The host 110 may include various types of processors. For example, the host 110 may include a graphics processing unit (GPU) or a central processing unit (CPU). The host 110 may include an input and output device configured to transfer a request directly to a memory area, not through a processor. For example, the host 110 may include an input and output device configured to transfer a request to the memory controller 120 through a direct memory access (DMA) in addition to a processor. However, examples are not limited to the foregoing examples, and the host 110 may include any or all types of devices that may transfer a memory request to the memory controller 120.

The first buffer 121 may store, in a queue, one or more memory requests received from the host 110. The queue may be a waiting line provided in a structure of a queue. The first buffer 121 may transfer the memory requests stored in the queue to the command generator 123. The first buffer 121 may transfer the memory requests stored in the queue to the command generator 123 in sequential order.

The command generator 123 may receive the memory requests, and set a type and an execution order of a command and transfer them to the second buffer 125. The memory requests transferred from the first buffer 121 may be transferred to the command generator 123 in an order in which the memory requests are stored in the queue.

The command generator 123 may generate a first command corresponding to a memory request and set a type of the first command that indicates whether an address included in the memory request corresponds to a PIM memory. The first command may be used herein to specify one command among one or more commands stored in the queue.

The command generator 123 may separate an address at which the command corresponding to the memory request is to be executed into a general memory and a PIM memory based on the address of the memory request. The command generator 123 may verify an area separating bit in an address field included in the memory request, and verify whether the memory request corresponds to the general memory or the PIM memory.

The area separating bit may refer to a bit that separates a general memory area and a PIM memory area by 0 and 1. For example, when the area separating bit is a first bit in the case of a 4-bit address, 0000 through 0111 may indicate the general memory area, and 1000 through 1111 may indicate the PIM memory area. However, examples are not limited thereto, and the area separating bit may be a bit at an arbitrary position in the address field.

The command generator 123 may set a command corresponding to the general memory to be an out-of-order type, and a command corresponding to the PIM memory to be an in-order type. The out-of-order type may also be referred to herein as a general memory area type, and the in-order type may also be referred to herein as a PIM memory area type. The command set to be the out-of-order type may have an execution order that is changed by the command scheduler 124, and the command set to be the in-order type may have an execution order that is maintained.

The command generator 123 may generate a command corresponding to a memory request. The command generator 123 may generate the command based on information included in the memory request. The command generator 123 may generate the command based on a command type and a command address or content that are included in the memory request. The command may include, for example, any of "activate," "precharge," "refresh," "read," and "write," but examples are not limited thereto. The command generator 123 may transfer the generated command to the second buffer 125. The command generator 123 may transfer generated commands to the second buffer 125 in sequential order.

The second buffer 125 may store a plurality of commands including the first command. The second buffer 125 may store, in a queue, the commands transferred from the command generator 123. The queue may be a waiting line provided in a structure of a queue.

The command scheduler 124 may perform scheduling on an execution order of the commands stored in the second buffer 125. The command scheduler 124 may perform scheduling on an execution order of a command based on a type of the command. The command scheduler 124 may determine whether to change an order of a first command stored in the second buffer 125 (e.g., whether to change a position of the first command within the execution order) based on a type of the first command. The command scheduler 124 may change an execution order of a command set as the out-of-order type. For example, when the type of the first command indicates the general memory, the command scheduler 124 may change an order of the first command. The command scheduler 124 may maintain an execution order of a command set as the in-order type. For example, when the type of the first command indicates the PIM memory, the command scheduler 124 may maintain the order of the first command.

The memory 130 may have a plurality of channels. The memory 130 may be divided into areas by a channel unit, and each channel unit may operate independently. Each channel may correspond to a memory controller. Referring to FIG. 1, one channel may correspond to a memory controller, and another channel may correspond to another memory controller. When memory requests occur from a plurality of hosts such as a processor and a DMA controller, the memory requests may be divided by each memory channel based on an address. The foregoing operations may be performed in parallel by a memory controller of a channel corresponding to each of the memory requests.

As shown, in an example, the memory controller 120 of one or more embodiments may modify an operating method of a general memory controller and may thus prevent the degradation of performance and stability that may occur in a PIM operation. For example, the memory controller 120 may set a type of a command by separating an address at which the command is to be executed into the general memory and the PIM memory, and determine whether to perform scheduling on the command in a queue based on the type.

When access to the PIM memory area is requested, the memory controller 120 may generate a command and store the command in the queue, and access the memory 130 in an order of commands being stored in the queue. In contrast, when access to the general memory area is requested, the memory controller 120 may generate a command and store the command in the queue, perform scheduling on the command in the queue, and thus access the memory 130 in a scheduled order. Thus, the memory controller 120 of one or more embodiments may increase the efficiency of an operation of the PIM memory while maintaining the efficiency of memory access to the general memory.

Although the memory controller 120 that controls the memory 130 is described above with reference to FIG. 1, examples are not limited thereto. The memory controller 120 may also be applicable to various storage devices that store data, in addition to the memory 130. For example, a controller that controls a cache or a write buffer may operate in a similar way as described above with reference to FIG. 1.

Figure 2:
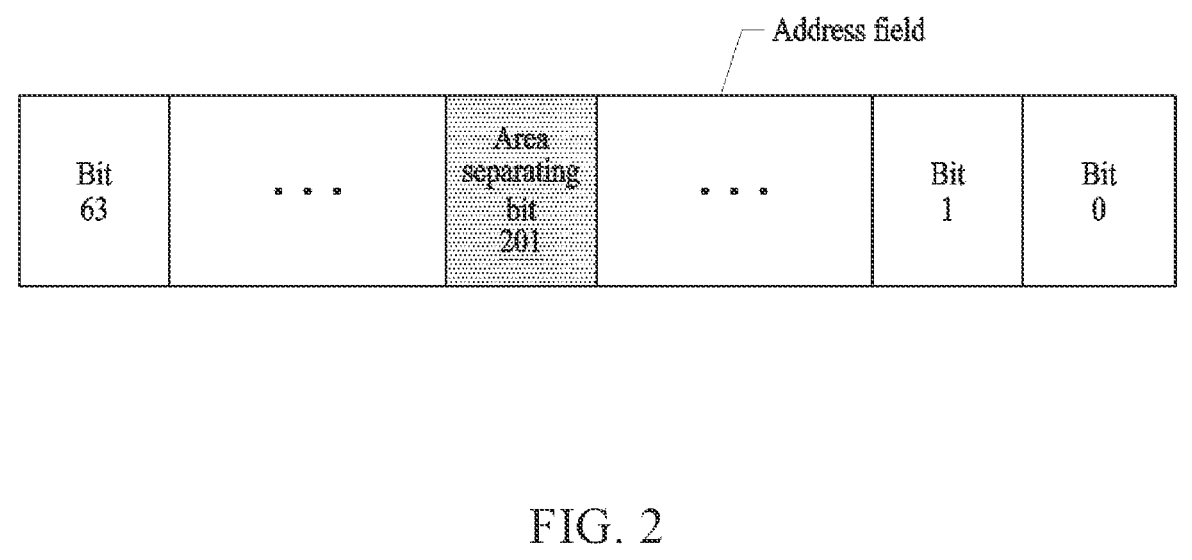

FIG. 2 illustrates an example of a field in which an address included in a memory request used by a memory controller is stored.

In an example, a memory request transferred from the host 110 may include an address field. The address field may include a plurality of bits, and one of the bits may be defined as an area separating bit. The area separating bit may be a bit that separates a PIM memory area and a general memory area by 0 and 1.

For example, referring to FIG. 2, a 64-bit system may use a 64-bit address system, and thus an address field may include 65 bits. Among the 64 bits, one bit may be set as an area separating bit 201.

In an example, the area separating bit 201 may function as a flag that separates a command type into an in-order type and an out-of-order type. In this example, the area separating bit 201 may indicate a type of an address, but may not indicate an address value.

In another example, the area separating bit 201 may indicate both a command type and an address value. For example, when the area separating bit 201 is a first bit, binary address values 000 . . . 0 through 011 . . . 1 may indicate a general memory area and binary address values 100 . . . 0 through 111 . . . 1 may indicate a PIM memory area.

Figure 3:
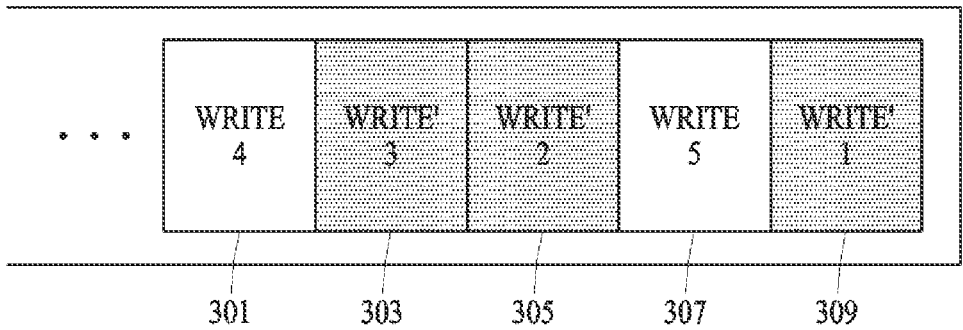
FIG. 3 illustrates an example of a command to be stored in a second buffer.

FIG. 3 illustrates an example of a command to be stored in a second buffer.

In an example, among commands stored in the second buffer 125 of the memory controller 120, a command of a PIM memory area type may have an order that is not changed by the command scheduler 124. The command scheduler 124 may change an order of a command of a general memory area type among commands stored in a queue for effective access to the memory 130.

Referring to FIG. 3, commands 301, 303, 305, 307, and 309 may be stored in the second buffer 125. For example, the second buffer 125 may include the commands 301, 303, 305, 307, and 309, and respective types of the commands 301, 303, 305, 307, and 309 may all be "WRITE."

When a data structure of the second buffer 125 is a first in first out (FIFO) queue, an order of commands may be defined as being from right to left. For example, an order starting from the command 309 to the command 301, for example, an order of the command 309→the command 307→the command 305→the command 303→the command 301, may be an original order of the commands in the queue.

The command 301 and the command 307 may be commands of which types are set as the general memory area type. The command 301 and the command 307 are indicated as WRITE to be identifiable from commands of the PIM memory area type.

The command 303, the command 305, and the command 309 may be commands of which types are set as the PIM memory area type. The command 303, the command 305, and the command 309 are indicated as WRITE' to be identifiable from commands of the general memory area type.

The command scheduler 124 may rearrange an order of commands for the general memory area to be more effective in access to the memory 130. For example, although the command 307 and the command 301 may be stored in the queue in an order starting from the command 307 to the command 301, an execution order in which the command 307 and command 301 are executed may be changed to an order starting from the command 301 to the command 307 through scheduling performed by the command scheduler 124. In the example of FIG. 3, the order of the command 301 may be fourth and the order of the command 307 may be fifth, and then the command 301 may be indicated as "WRITE 4" and the command 307 as "WRITE 5."

The order of commands of the PIM memory area type may not be changed by the command scheduler 124. For example, an execution order of the command 309, the command 305, and the command 303 may be maintained as the original order as in the queue. The command scheduler 124 may not change the order of the command 309, the command 305, and the command 303 for effective memory access. In the example of FIG. 3, the order of the command 309 may be first, the order of the command 305 may be second, and the command 303 may be third, and then the command 309 may be indicated as "WRITE' 1," the command 305 as "WRITE' 2," and the command 303 as "WRITE' 3."

Through the operations described above, the memory controller 120 of one or more embodiments may reduce a disadvantageous delay of a typical memory controller that may be caused by an operation added to an application program for forcibly following an order of commands that is rearranged by a command scheduler for an operation in a PIM memory. Thus, the memory controller 120 of one or more embodiments may improve performance and stability (e.g., by distinguishing between an order of commands for PIM memory, and an order of commands for general memory, and maintaining the order of commands for PIM memory).

FIG. 4 illustrates an example of a memory control method.

In an example, a memory controller may include a first buffer, a command generator, a command scheduler, and a second buffer.

In operation 401, the first buffer may receive a memory request from a host and store the received memory request.

In operation 403, the command generator may generate a first command corresponding to the memory request.

In operation 405, the command generator may set a type of the first command indicating whether an address included in the memory request corresponds to a PIM memory.

In operation 407, the second buffer may store a plurality of commands including the first command.

In operation 409, the command scheduler may determine whether to change an order of the first command stored in the second buffer based on the type of the first command. When the type of the first command indicates the PIM memory, the command scheduler may maintain the order of the first command. When the type of the first command indicates a general memory, the command scheduler may change the order of the first command.

Figure 5:
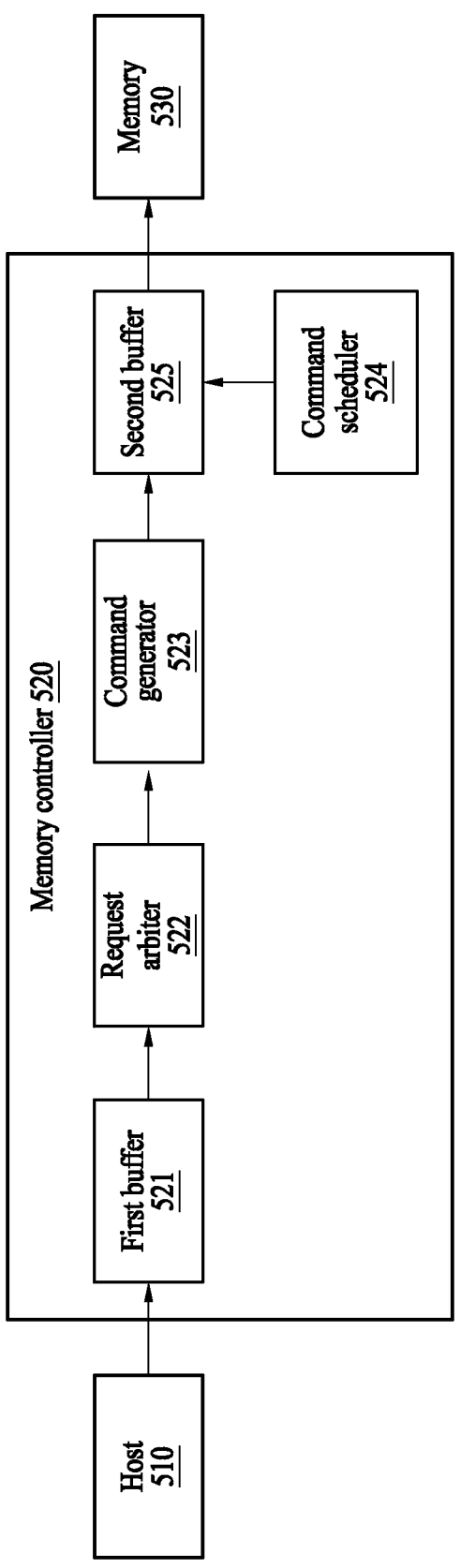
FIG. 5 illustrates an example of a configuration of a memory controller.

FIG. 5 illustrates an example of a configuration of a memory controller.

In an example, a memory controller 520 may include a first buffer 521, a request arbiter 522, a command generator 523, a command scheduler 524, and a second buffer 525.

The memory controller 520 may receive a memory request from a host 510 and store the received memory request in a queue. A general memory controller may transfer memory requests to a command generator by changing an order of the memory requests stored in a queue for effective memory access. In this process, the order of the memory requests stored in the queue may be changed. For example, the general memory controller may transfer memory requests stored in the queue, for example, a "READ" request, a "READ" request, and a "WRITE" request, by changing the order of the memory requests to an order starting from the "WRITE" request such that the order is the "WRITE" request, the "READ" request, and the "READ" request.

A PIM memory may not only store data but also have an operation that is performed through an internal processor. Thus, when an order of memory requests in a queue is changed, an order of commands to be generated may also be changed, and thus efficiency of a typical PIM memory may be degraded. The operation performed in the typical PIM memory may be suitable for an original order of memory requests stored in the queue, but not for a rearranged order of the memory requests.

The memory controller 520 of one or more embodiments may set an order of commands for a PIM memory area in the queue not to be changed. The host 510 may transfer memory requests to the memory controller 520, and the memory requests may be stored in sequential order in the first buffer 521.

The request arbiter 522 may verify an address of a memory request stored in the first buffer 521 and determine whether the address corresponds to a general memory area or the PIM memory area. The request arbiter 522 may determine whether the address corresponds to the general memory area or the PIM memory area based on an area separating bit of the address included in the memory request. The request arbiter 522 may set a type of memory area.

When the type of memory area corresponds to the PIM memory area, the request arbiter 522 may transfer the memory request to the command generator 523 while maintaining the order of the memory request in the queue. Alternatively, when the type of memory area corresponds to the general memory area, the request arbiter 522 may transfer the memory request to the command generator 523 in an order that enables effective access to a memory 530.

The command generator 523 may verify a type of the memory request transferred from the request arbiter 522. The command generator 523 may generate a command and transfer the generated command to a queue of the second buffer 525. When the memory request is determined to correspond to the PIM memory area, the command scheduler 524 may maintain an order of the command for the PIM memory area to access the memory 530.

For this, the host 510 may transfer a memory request to the first buffer 521 of the memory controller 520. The first buffer 521 may receive the memory request from the host 510 and store the received memory request. The memory request may include information of a command to be performed by the memory controller 520. The memory request may include a type and an address of the command.

In the case of a write request, the memory request may further include a content to be included in the address of the command.

The first buffer 521 may store, in a queue, one or more memory requests received from the host 510. The queue may be a waiting line provided in a structure of a queue.

The request arbiter 522 may separate an address at which the command corresponding to the memory request is to be executed into a general memory and a PIM memory based on an address of the memory request. The request arbiter 522 may verify an area separating bit of an address field included in the memory request, and determine whether the memory request corresponds to the general memory or the PIM memory.

The area separating bit may refer to a bit that separates the general memory area and the PIM memory area by 0 and 1. For example, when the area separating bit is a first bit in the case of a 4-bit address, 0000 through 01111 may indicate the general memory area and 1000 through 1111 may indicate the PIM memory area. However, examples are not limited thereto, and the area separating bit may be a bit at an arbitrary position in the address field.

The request arbiter 522 may set a command corresponding to the general memory to be an out-of-order type, and a command corresponding to the PIM memory to be an in-order type. The out-of-order type may also be referred to herein as a general memory area type, and the in-order type may also be referred to herein as a PIM memory area type. An order in which a memory request set as the out-of-order type is to be transferred may be changed by the request arbiter 522, and an (execution) order in which a command generated by the memory request is to be executed may be changed by the command scheduler 524. An order in which a memory request set as the in-order type is to be transferred may be maintained, and an (execution) order in which a command generated by the memory request is to be executed may also be maintained.

The request arbiter 522 may transfer one or more memory requests stored in the queue to the command generator 523. For example, the request arbiter 522 may transfer a memory request to the command generator 523 based on a type of the memory request. The request arbiter 522 may change an order of a memory request set as the out-of-order type, and transfer the memory request to the command generator 523 in the changed order. The request arbiter 522 may maintain an order of a memory request set as the in-order type, and transfer the memory request to the command generator 523 in the maintained order.

The command generator 523 may generate commands corresponding to the memory requests. For example, the command generator 523 may generate a command based on information included in a memory request. The command generator 523 may generate the command based on a command type and a command address or content that are included in the memory request. The command may include, for example, any of "activate," "precharge," "refresh," "read," and "write," but examples of which are not limited thereto. The command generator 523 may transfer the generated commands to the second buffer 525. The command generator 523 may transfer the generated commands to the second buffer 525 in sequential order.

The second buffer 525 may store therein a plurality of commands including a first command. The second buffer 525 may store one or more commands received from the command generator 523 in a queue. For example, the queue may be a waiting line provided in a structure of a queue.

The command scheduler 524 may perform scheduling on an execution order of the commands stored in the second buffer 525. For example, the command scheduler 524 may perform scheduling on an execution order of a command based on a type of the command. The command scheduler 524 may determine whether to change an order of a first command stored in the second buffer 525 based on a type of the first command. The command scheduler 524 may change an execution order of a command set as the out-of-order type. When the type of the first command indicates the general memory, the command scheduler 524 may change an order of the first command. The command scheduler 524 may maintain an execution order of a command set as the in-order type. When the type of the first command indicates the PIM memory, the command scheduler 524 may maintain the order of the first command.

The memory 530 may have a plurality of channels. The memory 530 may be divided into areas by a channel unit, and each channel unit may operate independently. Each channel may correspond to a memory controller. Referring to FIG. 5, one channel may correspond to a memory controller, and another channel may correspond to another memory controller. When memory requests occur from a plurality of hosts such as a processor and a DMA controller, the memory requests may be divided by a memory channel based on an address. The foregoing operations may be performed in parallel by a memory controller of a channel corresponding to each of the memory requests.

As shown, in an example, the memory controller 520 of one or more embodiments may modify an operating method of a general memory controller and may thus prevent the degradation of performance and stability that may occur in a PIM operation. For example, the memory controller 520 may set a type of a memory request by separating an address of the memory request into the general memory and the PIM memory. The memory controller 520 may then determine whether to perform scheduling on an order in which the memory request is to be transferred and whether to perform scheduling on commands in a queue, based on the type. The memory controller 520 of one or more embodiments may thus increase the efficiency of an operation for the PIM memory while maintaining the efficiency of memory access to the general memory.

FIG. 6 illustrates an example of a memory control method.

In an example, a memory controller may include a first buffer, a request arbiter, a command generator, a command scheduler, and a second buffer.

In operation 601, the first buffer may receive a memory request from a host and store the received memory request.

In operation 603, the request arbiter may set a type of a first command indicating whether an address included in the memory request corresponds to a PIM memory. The memory request may include a field indicating the address, and the field may include an area separating bit that separates an address of a general memory and an address of the PIM memory. The request arbiter may set the type of the first command based on the area separating bit.

In operation 605, the request arbiter may determine whether to change an order of the memory request to be transferred to the command generator based on the type of the first command. When the type of the first command indicates the PIM memory, the request arbiter may maintain the order of the memory request. When the type of the first command indicates the general memory, the request arbiter may change the order of the memory request.

In operation 607, the command generator may generate a first command corresponding to the memory request and the type of the first command based on the order of the memory request.

In operation 609, the second buffer may store a plurality of commands including the first command.

In operation 611, the command scheduler may determine whether to change the order of the first command stored in the second buffer based on the type of the first command. When the type of the first command indicates the PIM memory, the command scheduler may maintain the order of the first command. When the type of the first command indicates the general memory, the command scheduler may change the order of the first command.

The memory controllers, first buffers, command generators, command schedulers, second buffers, hosts, memories, request arbiters, memory controller 120, first buffer 121, command generator 123, command scheduler 124, second buffer 125, host 110, memory 130, memory controller 520, first buffer 521, request arbiter 522, command generator 523, command scheduler 524, second buffer 525, host 510, memory 530, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A memory controller comprising:
one or more buffers configured to:
receive a memory request from a host; and
store therein the received memory request and a plurality of commands comprising a generated first command corresponding to the memory request;
a command controller configured to:
generate the first command;
set a type of the first command indicating whether an address comprised in the memory request corresponds to a processing in memory (PIM) memory or a general memory;
maintain an order of the first command among commands corresponding to the PIM memory stored in the one or more buffers, in response to the type of the first command indicating the PIM memory; and
change the order of the first command among the commands corresponding to the general memory, in response to the type indicating the general memory.

2. The memory controller of claim 1, wherein the memory request comprises a field indicating the address, the field comprises an area separating bit that separates an address of the general memory and an address of the PIM memory, and
for the setting of the type of the first command, the command controller is configured to set the type of the first command based on the area separating bit.

3. A memory control method comprising:
by one or more buffers, receiving a memory request from a host and storing therein the received memory request;
by a command controller,
generating the first command,
in response to determining to perform scheduling, setting a type of the first command indicating whether an address comprised in the memory request corresponds to a processing in memory (PIM) memory or a general memory, and
scheduling a plurality of commands comprising the first command by maintaining an order of the first command among commands corresponding to the PIM memory, in response to the type of the first command indicating the PIM memory, and changing the order of the first command among the commands corresponding to the PIM memory, in response to the type indicating the general memory; and
by the one or more buffers, storing the scheduled plurality of commands.

4. The method of claim 3, wherein the determining to perform scheduling comprises determining the address comprised in the memory request corresponds to either one of the PIM memory and the general memory.

5. A memory controller comprising:
a command generator configured to:
set a type of a command based on an area separating bit of an address in a stored memory request, the type indicating whether the address corresponds to a processing in memory (PIM) memory or a general memory;
maintain an order of the command among commands corresponding to the PIM memory stored in a buffer, in response to the type of the command set by the command generator indicating the PIM memory; and
change the order of the commands corresponding to the general memory, in response to the type indicating the general memory.

6. The memory controller of claim 5, wherein
the area separating bit corresponds to a value range, and
for the setting of the type of the command, the command generator is configured to:
set the type of the command indicating the address corresponds to the PIM memory, in response to a value of a field of the address being greater than the value range; and
set the type of the command indicating the address corresponds to the general memory, in response to the value of the field being within the value range.

7. The memory controller of claim 5, wherein the command generator is configured to change an order of one or more other commands stored in the buffer, in response to the type of the command indicating the PIM memory.

8. The memory controller of claim 5, wherein the memory controller is configured to access a memory based on the order of the command.

* * * * *